(12) United States Patent
Maki

(10) Patent No.: US 11,831,827 B2
(45) Date of Patent: Nov. 28, 2023

(54) DOCUMENT DETERMINATION SYSTEM, DOCUMENT DETERMINATION METHOD, AND INFORMATION PROCESSING APPARATUS

(71) Applicant: SEIKO EPSON CORPORATION, Tokyo (JP)

(72) Inventor: Yoichiro Maki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/808,201

(22) Filed: Jun. 22, 2022

(65) Prior Publication Data
US 2022/0417379 A1    Dec. 29, 2022

(30) Foreign Application Priority Data

Jun. 25, 2021    (JP) ................................. 2021-105371

(51) Int. Cl.
*H04N 1/60*    (2006.01)
*H04N 1/00*    (2006.01)

(52) U.S. Cl.
CPC ..... *H04N 1/00883* (2013.01); *H04N 1/00816* (2013.01); *H04N 1/00824* (2013.01)

(58) Field of Classification Search
None
See application file for complete search history.

(56) References Cited

U.S. PATENT DOCUMENTS

2005/0234857 A1\* 10/2005 Plutchak ................ G06V 20/80
2011/0128566 A1    6/2011 Eum et al.

FOREIGN PATENT DOCUMENTS

JP    2007124234 A  \*  5/2007
JP    2008-016934 A    1/2008

\* cited by examiner

*Primary Examiner* — Dung D Tran
(74) *Attorney, Agent, or Firm* — WORKMAN NYDEGGER

(57) ABSTRACT

A document determination system includes a server apparatus that stores document data, a second multi-function printer that generates an authentic printed product, which is an authentic printed product in which a document represented by document data stored in the server apparatus is printed and in which at least a portion of the document is printed in composite black that is black represented using ink of a plurality of colors, and a third multi-function printer that reads a printed surface of a reading target including the authentic printed product and a duplicate of the authentic printed product. The server apparatus determines, based on whether at least the portion of the document represented by read data generated through reading by the third multi-function printer is printed in composite black, whether the reading target read by the third multi-function printer is the authentic printed product.

6 Claims, 9 Drawing Sheets

FIG. 4
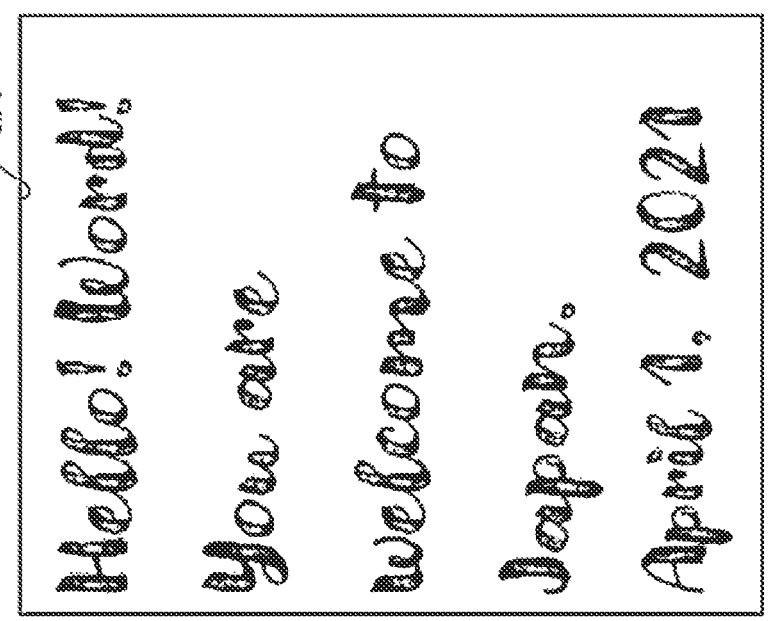
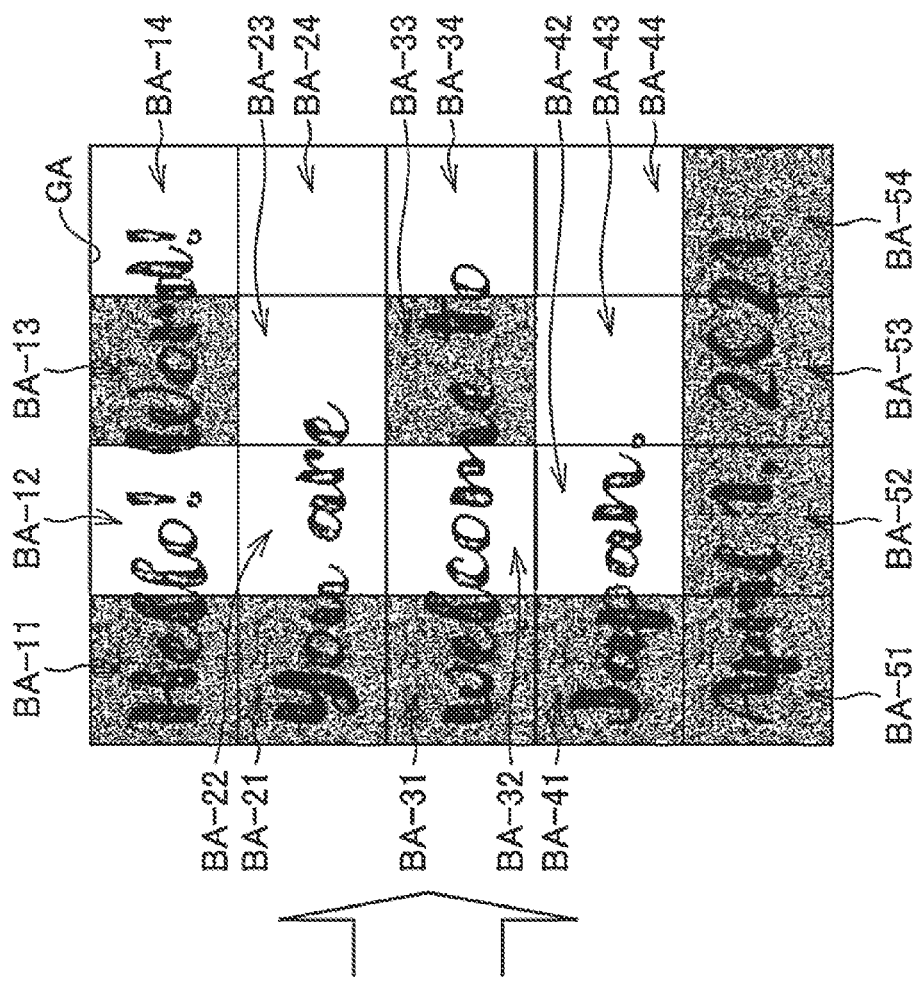

DOCUMENT DETERMINATION SYSTEM, DOCUMENT DETERMINATION METHOD, AND INFORMATION PROCESSING APPARATUS

The present application is based on, and claims priority from JP Application Serial Number 2021-105371, filed Jun. 25, 2021, the disclosure of which is hereby incorporated by reference herein in its entirety.

BACKGROUND

1. Technical Field

The present disclosure relates to a document determination system, a document determination method, and an information processing apparatus.

2. Related Art

Related art techniques for identifying whether an authentic document has been printed are known.

JP-A-2008-16934 describes techniques of printing a document such that a hash value generated from print data is embedded as a pattern, which enables the authenticity of the document to be ascertained.

Regarding the techniques for identifying whether an authentic document has been printed, techniques that can determine whether a document is authentic more easily than the techniques described in, for example, JP-A-2008-16934 are desired.

SUMMARY

A document determination system includes an information processing apparatus configured to store document data; a printing apparatus configured to generate an authentic printed product, the authentic printed product being an authentic printed product in which a document represented by the document data stored in the information processing apparatus is printed and in which at least a portion of the document is printed in composite black, the composite black being black represented using printing materials of a plurality of colors; and a reading apparatus configured to read a printed surface of a reading target including the authentic printed product and a duplicate of the authentic printed product. The information processing apparatus is configured to determine, based on whether the at least the portion of the document represented by read data generated through reading by the reading apparatus is printed in the composite black, whether the reading target read by the reading apparatus is the authentic printed product.

A document determination method includes generating an authentic printed product, the authentic printed product being an authentic printed product in which a document represented by document data stored in an information processing apparatus is printed and in which at least a portion of the document is printed in composite black, the composite black being black represented using printing materials of a plurality of colors; reading, by a reading apparatus, a printed surface of a reading target including the authentic printed product and a duplicate of the authentic printed product; and determining, based on whether the at least the portion of the document represented by read data generated through reading by the reading apparatus is printed in the composite black, whether the reading target read by the reading apparatus is the authentic printed product.

An information processing apparatus includes a storage configured to store document data; and an authentication determiner configured to determine, based on whether at least a portion of a document represented by read data generated through reading by a reading apparatus is printed in composite black, the composite black being black represented using a plurality of printing materials, whether a reading target read by the reading apparatus is an authentic printed product in which a document represented by the document data stored in the storage is printed and in which at least a portion of the document represented by the document data stored in the storage is printed in the composite black.

BRIEF DESCRIPTION OF THE DRAWINGS

FIG. 4 is a pictorial representation specifically illustrating the registration request information generating process.

DESCRIPTION OF EXEMPLARY EMBODIMENTS

Figure 1:
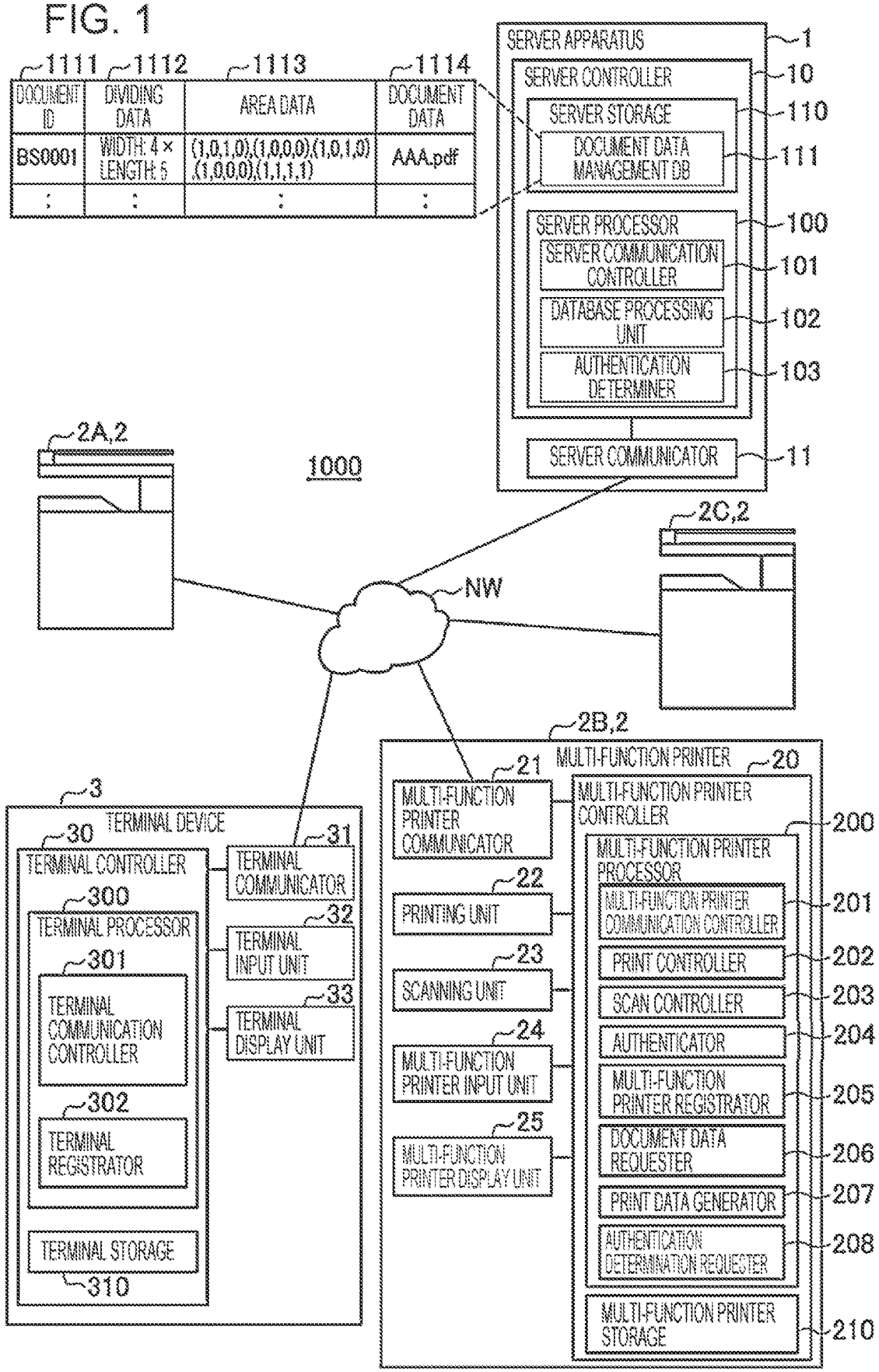
FIG. 1 is a diagram illustrating a configuration of a document determination system.

FIG. 1 is a diagram illustrating a configuration of a document determination system 1000.

The document determination system 1000 includes a server apparatus 1, a first multi-function printer 2A, a second multi-function printer 2B, a third multi-function printer 2C, and a terminal device 3.

The first multi-function printer 2A, the second multi-function printer 2B, and the third multi-function printer 2C will each be hereinafter referred to as a multi-function printer and denoted by reference numeral 2 when they are not discriminated from each other.

The server apparatus 1 corresponds to an example of an information processing apparatus. In the present embodiment, the second multi-function printer 2B corresponds to an example of a printing apparatus. In the present embodiment, the third multi-function printer 2C corresponds to an example of a reading apparatus.

Each of the multi-function printers 2 and the terminal device 3 is connected to a communication network NW and is communicatively connected to the server apparatus 1. The communication network NW is a network including a public network, a leased line, other communication links, and various types of communication equipment. There is no restriction on a specific form of the communication network NW. For example, the communication network NW may be a wide area network or may be a local network within a building. Additionally, the communication network NW may be configured to include at least one of wireless communication circuitry and wired communication circuitry.

The multi-function printer 2 is also called a multifunction peripheral (MFP) and is a device having various functions such as a print function and a scan function. The multi-function printer 2 according to the present embodiment includes a serial type ink jet head and carries out printing using the included ink jet head.

The first multi-function printer 2A registers document data 1114 in the server apparatus 1 by sending the document data 1114 to the server apparatus 1. The document data 1114 sent from the first multi-function printer 2A is read data generated using the scan function of the first multi-function printer 2A. Examples of the data format of read data include portable document format (PDF).

The second multi-function printer 2B receives from the server apparatus 1 the document data 1114 registered in the server apparatus 1 and prints a document represented by the received document data 1114 to generate an authentic printed product AP. The authentic printed product AP is an authentic printed product that is generated by the second multi-function printer 2B and in which a document represented by the document data 1114 registered in the server apparatus 1 is printed. In the authentic printed product AP, a document represented by the document data 1114 stored in the server apparatus 1 is printed, and a portion of the document is printed in composite black. Composite black is black represented by a plurality of colors of ink. Examples of a combination of ink colors making up composite black include CMYK, YK, and YMC. As used herein, C is cyan, M is magenta, Y is yellow, and K is black.

Ink corresponds to an example of a printing material.

The third multi-function printer 2C reads the printed surface of a reading target using the scan function and requests the server apparatus 1 to perform authentication determination for the reading target the printed surface of which has been read. The authentication determination requested by the third multi-function printer 2C represents a determination of whether the reading target the printed surface of which has been read by the third multi-function printer 2C is the authentic printed product AP or a duplicate of the authentic printed product AP. The duplicate is a product obtained using a so-called copy function. Typically, in the duplicate, black is printed in pure black or composite black. Pure black is black represented by ink of only K.

The terminal device 3 is a personal computer (PC). Although the terminal device 3 illustrated in FIG. 1 is a notebook PC, the terminal device 3 may be a desktop PC, tablet PC, or smartphone. The terminal device 3 sends the document data 1114 to the server apparatus 1, thereby causing the document data 1114 to be registered in the server apparatus 1. The document data 1114 sent from the terminal device 3 is data, such as data stored in the terminal device 3 or data stored in a device coupled to the terminal device 3.

In response to a request from the second multi-function printer 2B, the server apparatus 1 sends the document data 1114 to the second multi-function printer 2B. When requested to perform authentication determination by the third multi-function printer 2C, the server apparatus 1 determines whether the reading target read by the third multi-function printer 2C is the authentic printed product AP or its duplicate.

The configuration of the multi-function printer 2 will be described.

In the present embodiment, the first multi-function printer 2A, the second multi-function printer 2B, and the third multi-function printer 2C have the same configuration. FIG. 1 illustrates the configuration of the second multi-function printer 2B as the representative of the multi-function printers.

The multi-function printer 2 includes a multi-function printer controller 20, a multi-function printer communicator 21, a printing unit 22, a scanning unit 23, a multi-function printer input unit 24, and a multi-function printer display unit 25.

The multi-function printer controller 20 includes a multi-function printer processor 200, which is a processor such as a central processing unit (CPU) or micro-processing unit (MPU) for executing a program, and a multi-function printer storage 210. The multi-function printer controller 20 controls components of the multi-function printer 2 when the multi-function printer processor 200 reads and executes a control program stored in the multi-function printer storage 210. The multi-function printer processor 200 executes a control program stored in the multi-function printer storage 210 to serve as a multi-function printer communication controller 201, a print controller 202, a scan controller 203, an authenticator 204, a multi-function printer registrator 205, a document data requester 206, a print data generator 207, and an authentication determination requester 208.

The multi-function printer storage 210 includes a memory for storing programs that are executed by the multi-function printer processor 200 and data that is processed by the multi-function printer processor 200. The multi-function printer storage 210 stores a control program that is executed by the multi-function printer processor 200 and other various types of data. The multi-function printer storage 210 has a nonvolatile storage area. Additionally, the multi-function printer storage 210 may have a volatile storage area constituting a work area of the multi-function printer processor 200.

The multi-function printer communicator 21 is a communication interface including a communication circuit, a connector, and other components and communicates with a device connected to the communication network NW in compliance with given communication standards. The communication standards of the multi-function printer communicator 21 may be either wireless communication standards or wired communication standards.

The printing unit 22 has a configuration related to printing including, for example, an ink jet head that ejects ink on a printing medium to form dots, a carriage that causes the ink jet head to operate in the scanning direction, a carriage drive motor that drives a carriage, a transport unit that transports a printing medium, and an ink supply unit that supplies ink to the ink jet head. Under control of the multi-function printer controller 20, the printing unit 22 ejects ink from nozzles of the ink jet head to form dots on a surface to be printed of the transported printing medium, thereby carrying out printing on the printing medium.

The scanning unit 23 has a configuration related to reading of a scanner or the like that reads characters and images recorded on a printed product. The scanning unit 23, for example, reads recorded characters and images by exposing a reading target to light emitted from a light source and outputs image data obtained by reading to the multi-function printer controller 20. The multi-function printer controller 20 performs data processing such as RGB conversion and compression processing for image data input from the scanning unit 23 to generate data in a given format as read data.

The multi-function printer input unit 24, which includes input means such as an operating switch and a touch panel provided in the multi-function printer 2, detects an operation of the user on the input means and provides an output to the multi-function printer controller 20. The multi-function printer controller 20 performs processing corresponding to the operation on the input means based on the input from the multi-function printer input unit 24.

The multi-function printer display unit 25, which includes a display, displays information on the display under control of the multi-function printer controller 20.

The multi-function printer processor 200 serves as the multi-function printer communication controller 201, the print controller 202, the scan controller 203, the authenticator 204, the multi-function printer registrator 205, the document data requester 206, the print data generator 207, and the authentication determination requester 208.

The multi-function printer communication controller 201 communicates with a device connected to the communication network NW via the multi-function printer communicator 21.

The print controller 202 performs control so that the printing unit 22 carries out printing on a printing medium.

The scan controller 203 performs control so that the scanning unit 23 reads characters and images from a reading target and generates read data.

The authenticator 204 performs user authentication. For example, the authenticator 204 receives authentication identification (ID) of a user via the multi-function printer input unit 24. If the received authentication ID indicates a regular user, the authenticator 204 determines that the user authentication is successful. However, if the received authentication ID does not indicate a regular user, the authenticator 204 determines that the user authentication has failed.

The multi-function printer registrator 205 registers the document data 1114. When the multi-function printer registrator 205 receives a registration instruction from a user via the multi-function printer input unit 24, the multi-function printer registrator 205 generates registration request information indicating a request for registration of the document data 1114. The registration request information includes the document data 1114 to be registered, document ID 1111 that is the identification information of the document data 1114, dividing data 1112, and area data 1113. The dividing data 1112 and the area data 1113 will be described later. The multi-function printer registrator 205 outputs the generated registration request information to the multi-function printer communication controller 201. Thereby, the registration request information is sent to the server apparatus 1 by the multi-function printer communication controller 201.

The dividing data 1112 corresponds to an example of identification data.

The document data requester 206 requests the document data 1114 registered in the server apparatus 1. The document data requester 206 generates document data request information for requesting the document data 1114 and outputs the generated document data request information to the multi-function printer communication controller 201. Thereby, the document data request information is sent to the server apparatus 1 by the multi-function printer communication controller 201.

The print data generator 207 generates print data to be processed by the print controller 202. The print data generator 207 will be described in more detail later. Upon generating the print data, the print data generator 207 outputs the generated print data to the print controller 202.

The authentication determination requester 208 requests the server apparatus 1 to perform authentication determination. The authentication determination requester 208 generates authentication determination request information for requesting authentication determination and outputs the generated authentication determination request information to the multi-function printer communication controller 201. Thereby, the authentication determination request information is sent to the server apparatus 1 by the multi-function printer communication controller 201.

Next, the terminal device 3 will be described.

The terminal device 3 includes a terminal controller 30, a terminal communicator 31, a terminal input unit 32, and a terminal display unit 33.

The terminal controller 30 includes a terminal processor 300, which is a processor such as a CPU or MPU for executing a program, and a terminal storage 310. The terminal controller 30 controls components of the terminal device 3 when the terminal processor 300 reads and executes a control program stored in the terminal storage 310. The terminal processor 300 executes a control program stored in the terminal storage 310 to serve as a terminal communication controller 301 and a terminal registrator 302.

The terminal storage 310 includes a memory for storing programs executed by the terminal processor 300 and data processed by the terminal processor 300. The terminal storage 310 stores a control program executed by the terminal processor 300, the document data 1114, and other various types of data. The terminal storage 310 has a nonvolatile storage area. Additionally, the terminal storage 310 may have a volatile storage area constituting a work area of the terminal processor 300.

The terminal communicator 31 is a communication interface including a communication circuit, a connector, and other components and communicates with a device connected to the communication network NW in compliance with given communication standards. The communication standards of the terminal communicator 31 may be either wireless communication standards or wired communication standards.

The terminal input unit 32 is an interface that is coupled to input means, such as an operating switch, a panel having a touch input capability, a mouse, and a keyboard provided in the terminal device 3, and that detects a user operation on the input means and outputs a detection result to the terminal controller 30. The terminal controller 30 performs processing corresponding to an operation on the input means based on an input from the terminal input unit 32.

The terminal display unit 33, which includes a display, displays information on the display under control of the terminal controller 30.

The terminal processor 300 serves as a terminal communication controller 301 and a terminal registrator 302.

The terminal communication controller 301 communicates with a device connected to the communication network NW via the terminal communicator 31.

The terminal registrator 302 registers the document data 1114. When the terminal registrator 302 receives a registration instruction from a user via the terminal input unit 32, the terminal registrator 302 generates registration request information indicating a request for registration of the document data 1114. Like the registration request information generated by the multi-function printer registrator 205, the registration request information generated by the terminal registrator 302 includes the document data 1114 to be registered, the document ID 1111, the dividing data 1112, and the area data 1113. The terminal registrator 302 outputs the generated registration request information to the terminal communication controller 301. Thereby, the registration request information is sent to the server apparatus 1 by the terminal communication controller 301.

Next, the server apparatus 1 will be described.

The server apparatus 1 includes a server controller 10 and a server communicator 11.

The server controller 10 includes a server processor 100, which is a processor such as a CPU or MPU for executing a program, and a server storage 110 and controls components of the server apparatus 1. The server controller 10 controls components of the server apparatus 1 when the server processor 100 reads and executes a control program stored in the server storage 110. The server processor 100 serves as a server communication controller 101, a database processing unit 102, and an authentication determiner 103.

The server storage 110 corresponds to an example of a storage.

The server storage 110 includes a memory for storing programs executed by the server processor 100 and data processed by the server processor 100. The server storage 110 stores a control program executed by the server processor 100, a document data management database (DB) 111, and other various types of data. The server storage 110 has a nonvolatile storage area. Additionally, the server storage 110 may have a volatile storage area to provide a work area of the server processor 100.

The document data management DB 111 is a database for managing the document data 1114 received as registration targets from the multi-function printer 2 and the terminal device 3. One record stored in the document data management DB 111 includes the document ID 1111, the dividing data 1112, the area data 1113, and the document data 1114.

The server communicator 11 is a communication interface including a communication circuit, a connector, and other components in compliance with given communication standards and communicates with the multi-function printer 2 and the terminal device 3 under control of the server controller 10.

As described above, the server processor 100 serves as the server communication controller 101, the database processing unit 102, and the authentication determiner 103.

The server communication controller 101 communicates with a device connected to the communication network NW via the server communicator 11.

The database processing unit 102 performs processing related to the document data management DB 111.

The authentication determiner 103 performs an authentication determination for determining whether the reading target is the authentic printed product AP or its duplicate.

The operations of the document determination system 1000 will be described.

First, the operations of the document determination system 1000 related to registration of the document data 1114 will be described.

Figure 2:
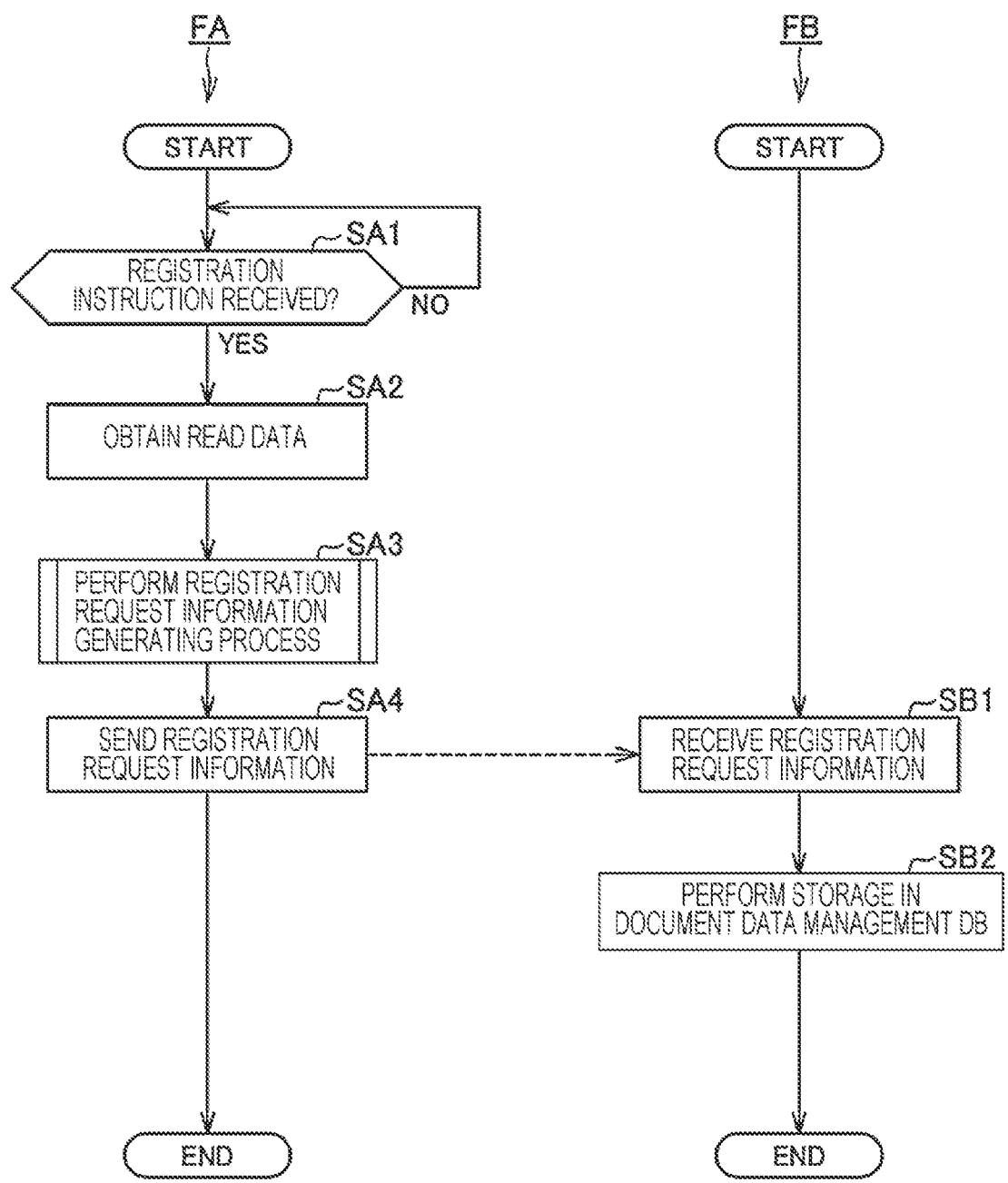
FIG. 2 includes flowcharts illustrating operations of the document determination system.

FIG. 2 includes flowcharts illustrating operations of the document determination system 1000. In FIG. 2, a flowchart FA illustrates operations of the first multi-function printer 2A and a flowchart FB illustrates operations of the server apparatus 1.

The multi-function printer registrator 205 determines whether an instruction for registration of the document data 1114 has been received from a user via the multi-function printer input unit 24 (step SA1).

If the multi-function printer registrator 205 determines that an instruction for registration of the document data 1114 has not been received from a user (No in step SA1), the multi-function printer registrator 205 performs again the determination in step SA1.

However, if the multi-function printer registrator 205 determines that an instruction for registration of the document data 1114 has been received from a user (Yes in step SA1), the scan controller 203 of the first multi-function printer 2A obtains read data by controlling the scanning unit 23 (step SA2).

Subsequently, the multi-function printer registrator 205 of the first multi-function printer 2A performs the registration request information generating process for generating registration request information (step SA3).

Figure 3:
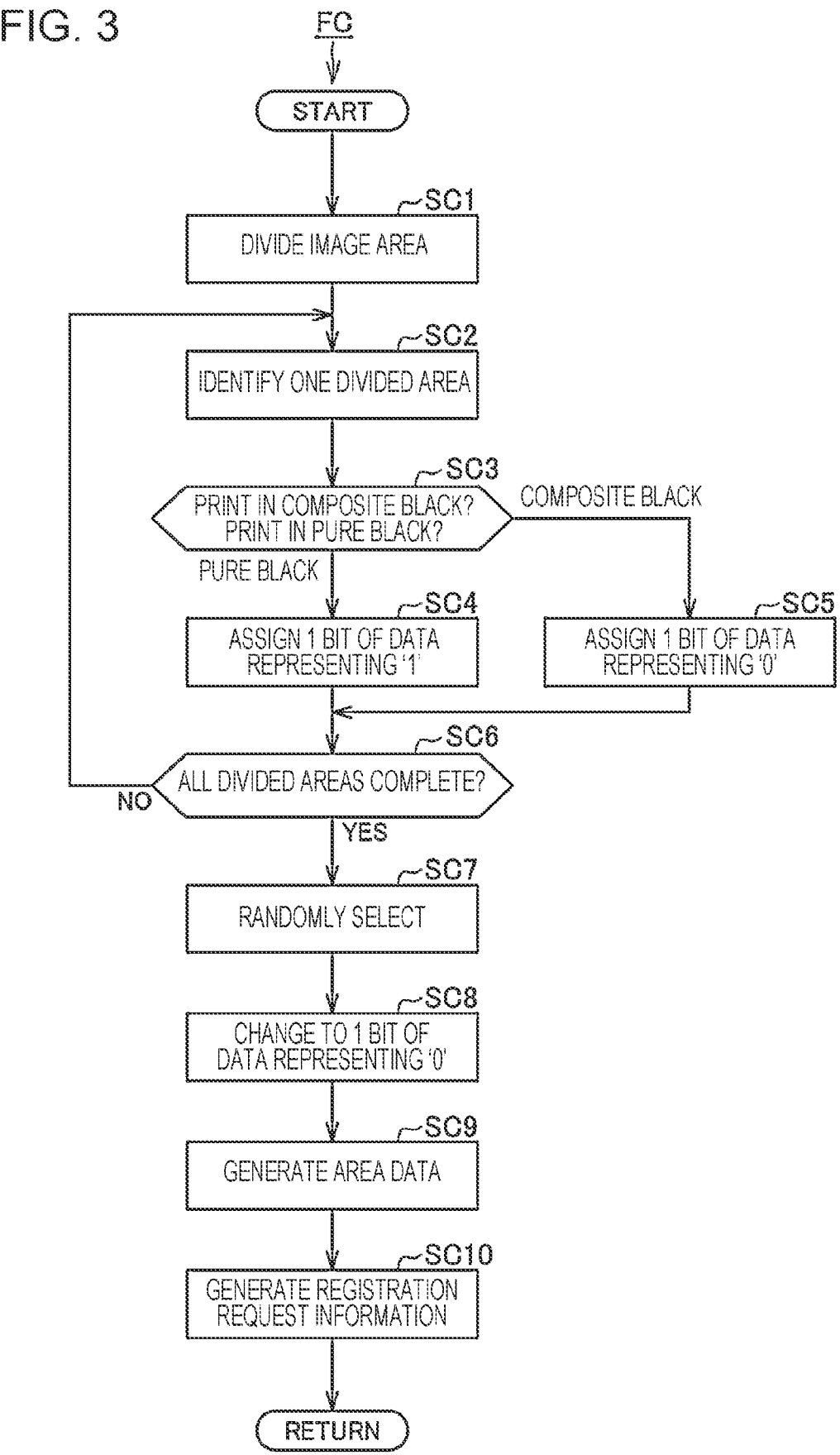
FIG. 3 is a flowchart illustrating a registration request information generating process.

FIG. 3 is a flowchart FC illustrating the registration request information generating process.

The multi-function printer registrator 205 horizontally and vertically divides, by a given number of times, an image area GA of a document indicated by the document data 1114 to be registered (step SC1). Thereby, the image area GA of the document is divided into grids.

One area resulting from the division will be hereinafter referred to as a divided area and denoted by reference characters BA.

Subsequently, the multi-function printer registrator 205 identifies one of the divided areas BA (step SC2) and determines, for the identified divided area BA, whether to print black in composite black or in pure black (step SC3).

In step SC3, for example, if the divided area BA includes a given number or more of black pixels, the multi-function printer registrator 205 determines that the divided area BA, which is the determination target, is to be printed in pure black; however, if the number of black pixels included in the divided area BA is less than the given number, the multi-function printer registrator 205 determines that the divided area BA, which is the determination target, is to be printed in composite black.

Regarding the divided area BA identified in step SC2, if the multi-function printer registrator 205 determines that black is to be printed in pure black (pure black in step SC3), the multi-function printer registrator 205 assigns 1 bit of data representing '1' to the divided area BA identified in step SC2 (step SC4). The 1 bit of data representing '1' is data representing that the divided area BA to which this data is assigned is a pure black area in which black is printed in pure black.

However, regarding the divided area BA identified in step SC2, if the multi-function printer registrator 205 determines that black is to be printed in composite black (composite black in step SC3), the multi-function printer registrator 205 assigns 1 bit of data representing '0' to the divided area BA identified in step SC2 (step SC5). The 1 bit of data representing '0' is data representing that the divided area BA to which this data is assigned is a composite black area in which black color is printed in composite black.

After performing step SC4 or step SC5, the multi-function printer registrator 205 determines whether step SC4 or step SC5 has been performed for all the divided areas BA (step SC6).

If the multi-function printer registrator 205 determines that step SC4 or step SC5 has not been performed for all the divided areas BA (No in step SC6), the multi-function printer registrator 205 returns to step SC2 and performs step SC2 and the subsequent steps for a divided area BA that has not been identified.

If the multi-function printer registrator 205 determines that step SC4 or step SC5 has been performed for all the divided areas BA (Yes in step SC6), the multi-function printer registrator 205 randomly selects one or more divided areas BA from the divided areas BA to which 1 bit of data representing '1' is assigned (step SC7). For example, the number of selected divided areas BA is about 50% of the total number of the divided areas BA to which 1 bit of data representing '1' is assigned.

Subsequently, for each of the divided areas BA selected in step SC7, the multi-function printer registrator 205 changes the assigned 1 bit of data to the 1 bit of data representing '0' (step SC8).

Subsequently, the multi-function printer registrator 205 generates the area data 1113 (step SC9). The area data 1113 is data representing whether each of the divided areas BA is a composite black area or a pure black area and is data described such that the respective pieces of the 1 bit of data assigned to the divided areas BA are arranged in a given order.

Subsequently, the multi-function printer registrator 205 generates the registration request information (step SC10). The registration request information generated in step SC10 includes the dividing data 1112 indicating the respective numbers of horizontal and vertical divided areas resulting from the division in step SC1, the area data 1113 generated in step SC9, the read data obtained, as the document data 1114 to be registered, in step SA2, and the document ID 1111.

FIG. 4 is a pictorial representation specifically illustrating the registration request information generating process.

In the case of FIG. 4, in step SC1, the multi-function printer registrator 205 divides the image area GA of a document indicated by the document data 1114 to be registered into five portions vertically and into four portions horizontally, resulting in a total of 20 divided areas BA.

In the description of FIG. 4, the divided area BA that is the ith from the top and jth from the left in the figure is referred to as a divided area BA-ij where i and j are integers greater than or equal to one.

In the case of FIG. 4, by performing steps SC2, SC3, SC4, SC5, and SC6, the multi-function printer registrator 205 assigns 1 bit of data representing '1' to the other divided areas BA than the divided areas BA-24 and BA-44 and assigns 1 bit of data representing '0' to the divided areas BA-24 and BA-44.

In the case of FIG. 4, in step SC7, the multi-function printer registrator 205 selects the divided areas BA-12, BA-14, BA-22, BA-23, BA-24, BA-32, BA-34, BA-42, BA-43, and BA-44. Then, in the case of FIG. 4, in step SC8, the multi-function printer registrator 205 changes the data assigned to the divided areas BA-12, BA-14, BA-22, BA-23, BA-24, BA-32, BA-34, BA-42, BA-43, and BA-44 from the 1 bit of data representing '1' to the 1 bit of data representing '0'.

In FIG. 4, after step SC8 has been performed, the entirety of each of the divided areas BA to which the 1 bit of data representing '1' is assigned is in color for the sake of convenience. As illustrated in FIG. 4, after step SC8 has been performed, the 1 bit of data representing '1' is assigned to each of the divided areas BA-11, BA-13, BA-21, BA-31, BA-33, BA-41, BA-51, BA-52, BA-53, and BA-54. Additionally, as illustrated in FIG. 4, after step SC8 has been performed, the 1 bit of data representing '0' is assigned to each of the divided areas BA-12, BA-14, BA-22, BA-23, BA-24, BA-32, BA-34, BA-42, BA-43, and BA-44.

In the case of FIG. 4, the multi-function printer registrator 205 generates the area data 1113 described in the row order from the top to the bottom in the figure and, for one row, in the order from left to right in the figure. That is, in the case of FIG. 4, the multi-function printer registrator 205 generates the area data 1113 indicating "(1, 0, 1, 0), (1, 0, 0, 0), (1, 0, 1, 0), (1, 0, 0, 0), (1, 1, 1, 1)".

In the case of FIG. 4, the multi-function printer registrator 205 generates the registration request information including the area data 1113 indicating "(1, 0, 1, 0), (1, 0, 0, 0), (1, 0, 1, 0), (1, 0, 0, 0), (1, 1, 1, 1)" and the dividing data 1112 indicating the vertical division into five portions and the horizontal division into four portions.

Returning back to the description on the flowchart FA illustrated in FIG. 2, the multi-function printer communication controller 201 of the first multi-function printer 2A sends the registration request information generated in step SA3 to the server apparatus 1 (step SA4).

As illustrated by the flowchart FB, the server communication controller 101 of the server apparatus 1 receives the registration request information from the first multi-function printer 2A (step SB1).

Subsequently, the database processing unit 102 generates a record having various types of data included in the received registration request information and stores the generated record in the document data management DB 111 (step SB2).

In the document determination system 1000, the terminal device 3 may also register the document data 1114.

Figure 5:
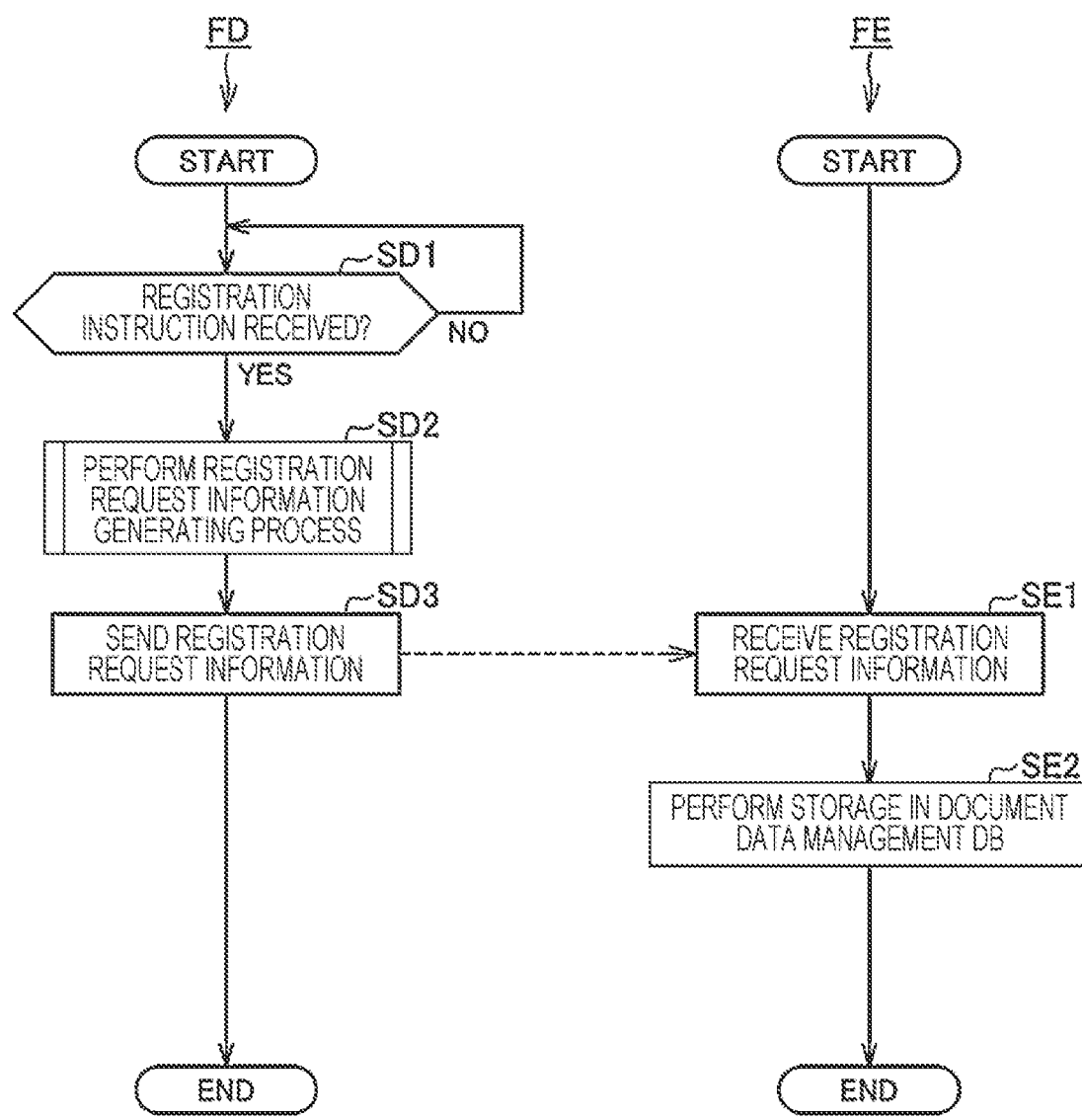
FIG. 5 includes flowcharts illustrating operations of the document determination system.

FIG. 5 includes flowcharts illustrating operations of the document determination system 1000. In FIG. 5, a flowchart FD illustrates operations of the terminal device 3 and a flowchart FE illustrates operations of the server apparatus 1.

The terminal registrator 302 of the terminal device 3 determines whether an instruction for registration of the document data 1114 has been received from a user via the terminal input unit 32 (step SD1).

If the terminal registrator 302 determines that an instruction for registration of the document data 1114 has not been received from the user (No in step SD1), the terminal registrator 302 performs again the determination in step SD1.

However, if the terminal registrator 302 determines that an instruction for registration of the document data 1114 has been received from the user (Yes in step SD1), the terminal registrator 302 performs a registration request information generating process (step SD2).

The registration request information generating process in step SD2 will be described using the flowchart FC in FIG. 3.

The terminal registrator 302 horizontally and vertically divides, by a given number, an image area GA of a document indicated by the document data 1114 to be registered (step SC1). Examples of the document data 1114 for division performed by the terminal registrator 302 include data stored in the terminal storage 310 and data stored in a device coupled to the terminal device 3.

Subsequently, the terminal registrator 302 identifies one of the divided areas BA (step SC2) and determines, for the selected divided area BA, whether to print black in composite black or in pure black (step SC3).

Regarding the divided area BA identified in step SC2, if the terminal registrator 302 determines that black is to be printed in pure black (pure black in step SC3), the terminal registrator 302 assigns 1 bit of data representing '1' to the divided area BA identified in step SC2 (step SC4).

However, regarding the divided area BA identified in step SC2, if the terminal registrator 302 determines that black is to be printed in composite black (composite black in step SC3), the terminal registrator 302 assigns 1 bit of data representing '0' to the divided area BA identified in step SC2 (step SC4).

After performing step SC4 or step SC5, the terminal registrator 302 determines whether step SC4 or step SC5 has been performed for all the divided areas BA (step SC6).

If the terminal registrator 302 determines that step SC4 or step SC5 has not been performed for all the divided areas BA (No in step SC6), the terminal registrator 302 returns to step SC2 and performs step SC2 and the subsequent steps for a divided area BA that has not been identified.

If the terminal registrator 302 determines that step SC4 or step SC5 has been performed for all the divided areas BA (Yes in step SC6), the terminal registrator 302 randomly selects one or more divided areas BA from the divided areas BA to which 1 bit of data representing '1' is assigned (step SC7).

Subsequently, for each of the divided areas BA selected in step SC7, the terminal registrator 302 changes the assigned 1 bit of data representing '1' to the 1 bit of data representing '0' (step SC8).

Subsequently, the terminal registrator 302 generates the area data 1113 (step SC9) and generates registration request information (steps SC10). The registration request information generated by the terminal registrator 302 includes the dividing data 1112 indicating the respective numbers of horizontal and vertical divided areas resulting from the division in step SC1, the area data 1113 generated in step SC9, the document data 1114 stored, as the document data 1114 to be registered, in the terminal storage 310, and the document ID 1111.

Returning back to the description on the flowchart FD illustrated in FIG. 5, the terminal communication controller 301 sends the registration request information generated in step SD2 to the server apparatus 1 (step SD3).

As illustrated by the flowchart FE, the server communication controller 101 receives the registration request information from the terminal device 3 (step SE1).

Subsequently, the database processing unit 102 generates a record having various types of data included in the received registration request information and stores the generated record in the document data management DB 111 (step SE2).

Next, the operations of the document determination system 1000 related to generation of the authentic printed product AP will be described.

Figure 6:
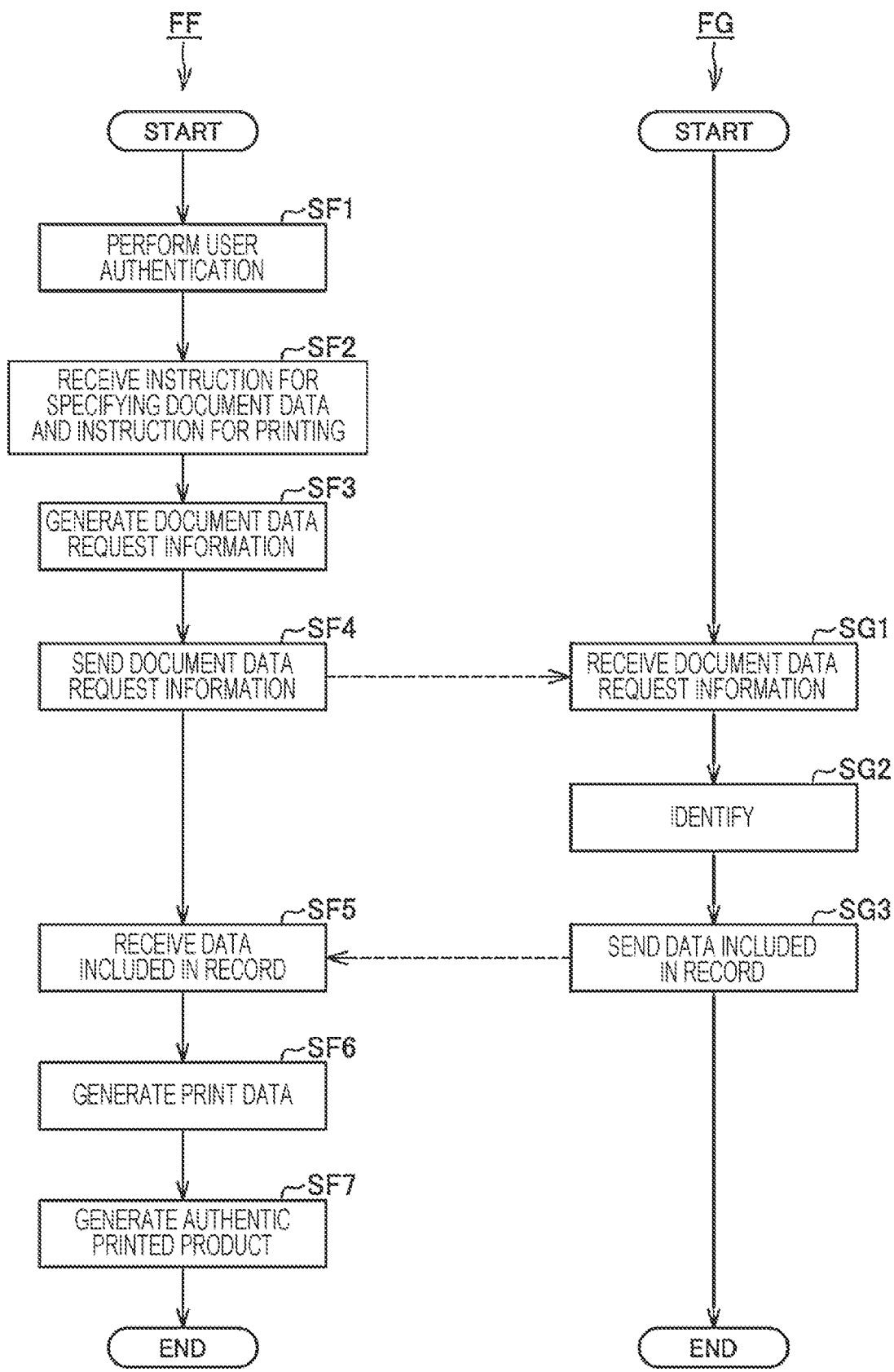
FIG. 6 includes flowcharts illustrating operations of the document determination system.

FIG. 6 includes flowcharts illustrating operations of the document determination system 1000. In FIG. 6, a flowchart FF illustrates operations of the second multi-function printer 2B and a flowchart FG illustrates operations of the server apparatus 1.

The authenticator 204 of the second multi-function printer 2B performs user authentication (steps SF1). If the user authentication fails, the multi-function printer processor 200 of the second multi-function printer 2B terminates the process. If the user authentication is successful, the multi-function printer processor 200 of the second multi-function printer 2B proceeds to step SF2.

The document data requester 206 of the second multi-function printer 2B receives, via the multi-function printer input unit 24, an instruction for specifying the document data 1114 as a printing target and an instruction for printing (step SF2).

When the document data requester 206 receives the instruction for specifying the document data 1114 and the instruction for printing, the document data requester 206 generates document data request information (step SF3).

The document data request information generated in steps SF3 includes the document ID 1111 of the document data 1114 specified by the user.

The multi-function printer communication controller 201 of the second multi-function printer 2B sends the document data request information generated in steps SF3 to the server apparatus 1 (step SF4).

As illustrated by the flowchart FG, the server communication controller 101 of the server apparatus 1 receives the document data request information from the second multi-function printer 2B (step SG1).

The database processing unit 102 identifies a record having the document ID 1111, which is included in the document data request information received in step SG1, from the document data management DB 111 (step SG2).

Subsequently, the server communication controller 101 sends the document ID 1111, the dividing data 1112, the area data 1113, and the document data 1114 included in the record identified in step SG2, as a response to the document data request information, to the second multi-function printer 2B (step SG3).

As illustrated by the flowchart FF, the multi-function printer communication controller 201 receives the document ID 1111, the dividing data 1112, the area data 1113, and the document data 1114 from the server apparatus 1 (step SF5).

The print data generator 207 generates print data based on the document ID 1111, the dividing data 1112, the area data 1113, and the document data 1114 received in step SF5 (step SF6).

Subsequently, the print controller 202 of the second multi-function printer 2B carries out printing based on the print data generated in steps SF6 to generate the authentic printed product AP (step SF7).

Figure 7:
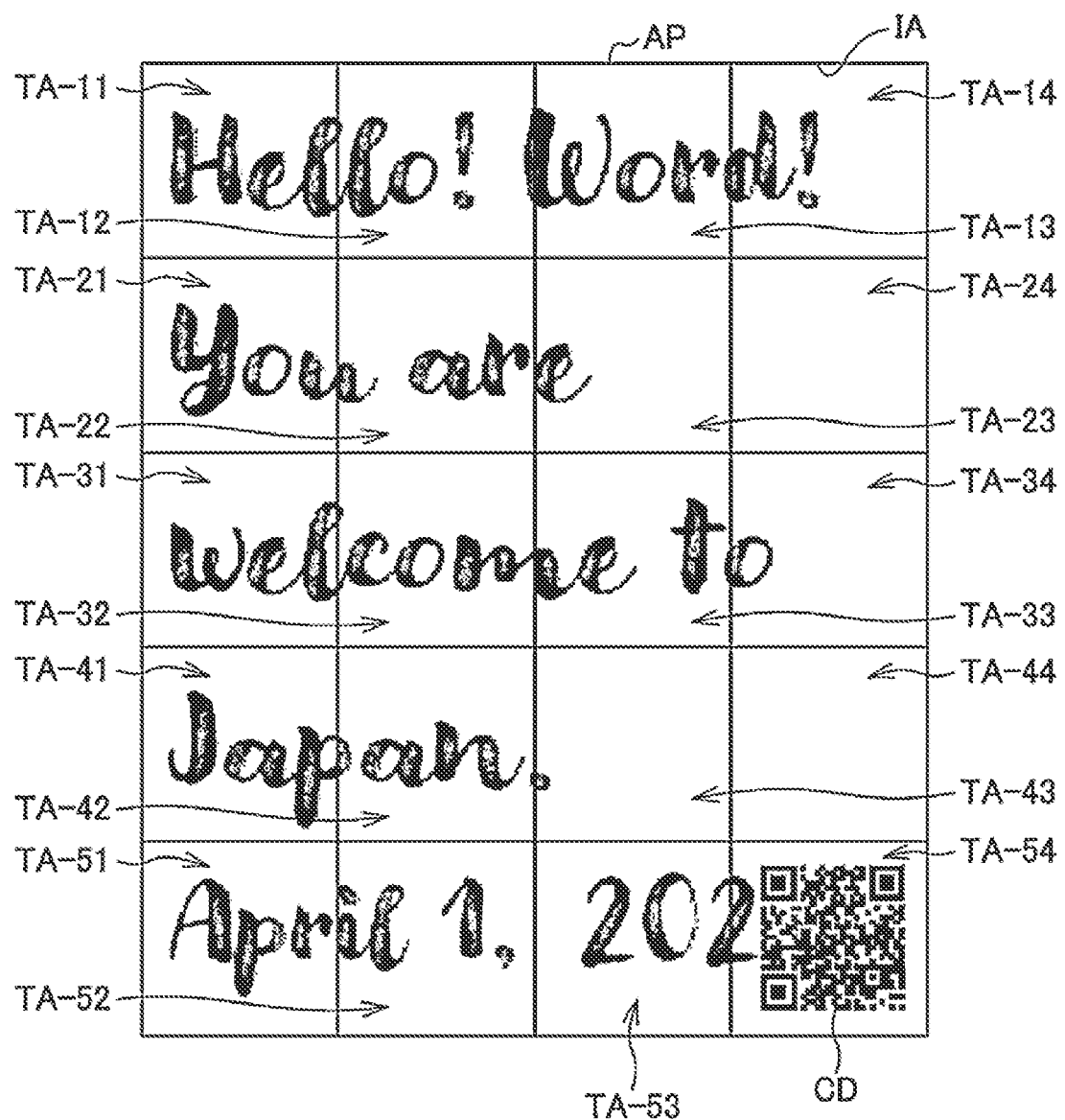
FIG. 7 is a pictorial representation illustrating an example of an authentic printed product.

FIG. 7 is a graphical representation illustrating an example of the authentic printed product AP.

FIG. 7 depicts the authentic printed product AP in which the document illustrated in FIG. 4 is printed based on the dividing data 1112 and the area data 1113.

In FIG. 7, lines are added onto the authentic printed product AP in a superimposed manner. The lines illustrated in FIG. 7 are provided for convenience in order to indicate an area corresponding to one divided area BA in a printing area IA of the authentic printed product AP and are not printed in the actual authentic printed product AP.

In the print area IA, an area corresponding to one divided area BA will be hereinafter referred to as a corresponding area and denoted by reference characters TA.

In the description of FIG. 7, the corresponding area TA that is the lth from the top and nth from the left in the figure is referred to as a corresponding area TA-ln, where l and n are integers greater than or equal to one.

In FIG. 7, the corresponding area TA-ln corresponds to the divided area BA-ij the reference character of which includes ij representing the same numerical value as ln. For example, a corresponding area TA-11 corresponds to a divided area BA-11 but does not correspond to any of the divided areas other than the divided area BA-11.

In the image area GA of the document illustrated in FIG. 4, 1 bit of data representing '1' is assigned to each of the divided areas BA-11, BA-13, BA-21, BA-31, BA-33, BA-41, BA-51, BA-52, BA-53, and BA-54. Therefore, in the authentic printed product AP illustrated in FIG. 7, black is printed in pure black in each of the corresponding areas TA-11, TA-13, TA-21, TA-31, TA-33, TA-41, TA-51, TA-52, TA-53, and TA-54.

Additionally, in the image area GA illustrated in FIG. 4, the 1 bit of data representing '0' is assigned to each of the divided areas BA-12, BA-14, BA-22, BA-23, BA-24, BA-32, BA-34, BA-42, BA-43, and BA-44. Therefore, in the authentic printed product AP illustrated in FIG. 7, black is printed in composite black in each of the corresponding areas TA-12, TA-14, TA-22, TA-23, TA-24, TA-32, TA-34, TA-42, TA-43, and TA-44.

Therefore, in generating the authentic printed product AP illustrated in FIG. 7, the print data generator 207 performs various processes such as a color conversion process, a halftone process, and rasterization for the document data 1114 to generate print data in which black is printed in pure black in each of the corresponding areas TA-11, TA-13, TA-21, TA-31, TA-33, TA-41, TA-51, TA-52, TA-53, and TA-54. Additionally, in generating the authentic printed product AP illustrated in FIG. 7, the print data generator 207 performs various processes such as a color conversion process, a halftone process, and rasterization for the document data 1114 to generate print data in which black is printed in composite black in each of the corresponding areas TA-12, TA-14, TA-22, TA-23, TA-24, TA-32, TA-34, TA-42, TA-43, and TA-44.

As illustrated in FIG. 7, in the authentic printed product AP, a code image CD is printed within the corresponding area TA-54. The code image CD is, for example, QR code (registered trademark). The code image CD printed in the authentic printed product AP contains the document ID 1111 and the dividing data 1112.

The print data generator 207 generates the code image CD containing the document ID 1111 and the dividing data 1112, generates image data in which the code image CD is superimposed in the divided area BA-54 of the image area GA of the document, and generates print data for printing the image data.

The position at which the code image CD is printed in the authentic printed product AP is not limited to the bottom right position as illustrated in FIG. 7 and may be any position.

Next, the operations of the document determination system 1000 related to authentication determination will be described.

Figure 8:
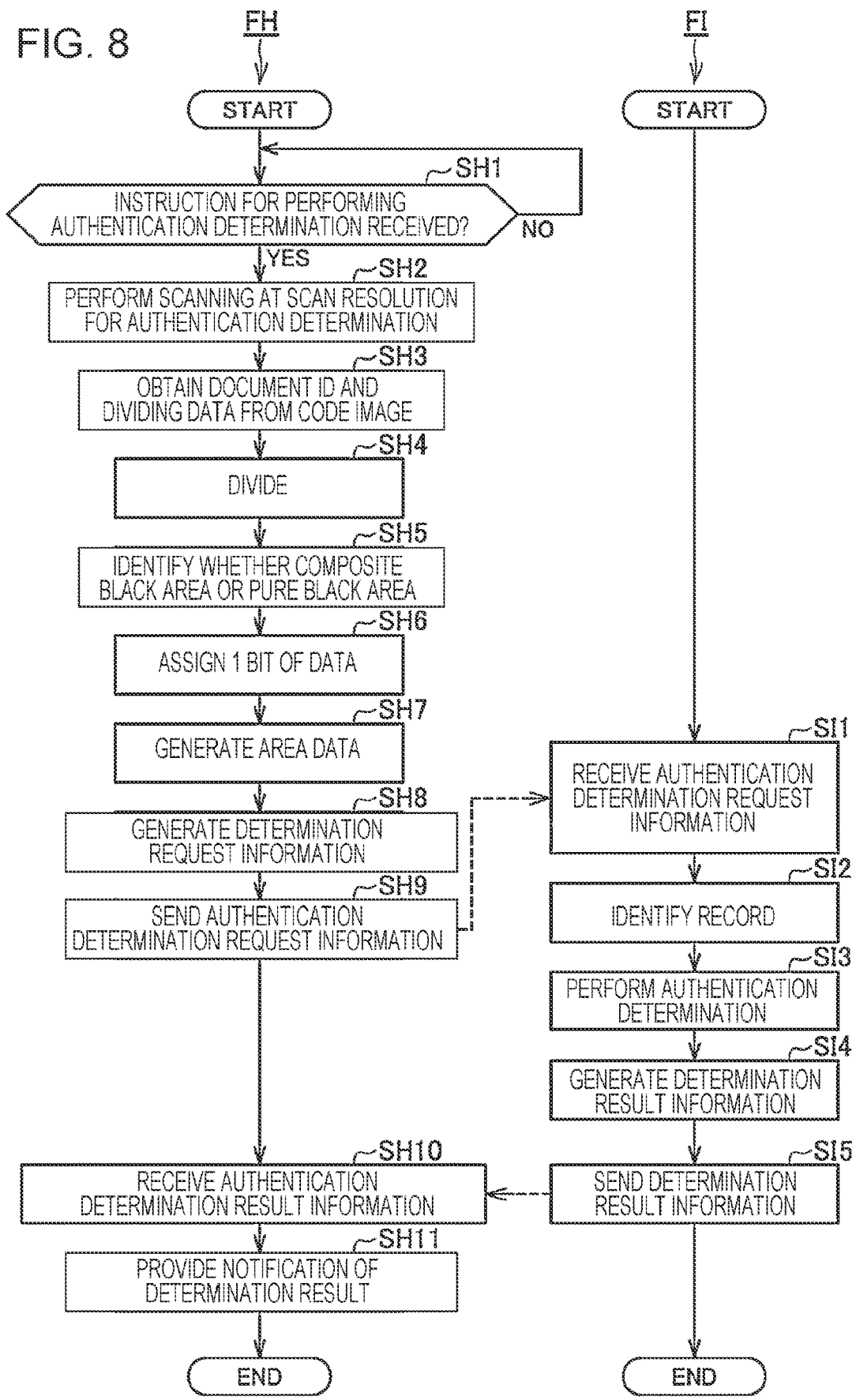
FIG. 8 includes flowcharts illustrating operations of the document determination system.

FIG. 8 includes flowcharts illustrating operations of the document determination system 1000. In FIG. 8, a flowchart FH illustrates operations of the third multi-function printer 2C and a flowchart FI illustrates operations of the server apparatus 1.

As illustrated by the flowchart FH, the authentication determination requester 208 of the third multi-function printer 2C determines whether an instruction for performing authentication determination has been received from a user via the multi-function printer input unit 24 (step SH1).

If the authentication determination requester 208 of the third multi-function printer 2C determines that an instruction for execution of authentication determination has not been received from a user (No in step SH1), the authentication determination requester 208 performs again the determination in step SH1.

If the authentication determination requester 208 determines that an instruction for execution of authentication determination has been received from a user (YES in step SH1), the scan controller 203 of the third multi-function printer 2C scans a reading target set in the third multi-function printer 2C at a scan resolution for authentication determination (step SH2). The scan resolution for authentication determination is a resolution greater than or equal to 1200 dpi.

Figure 9:
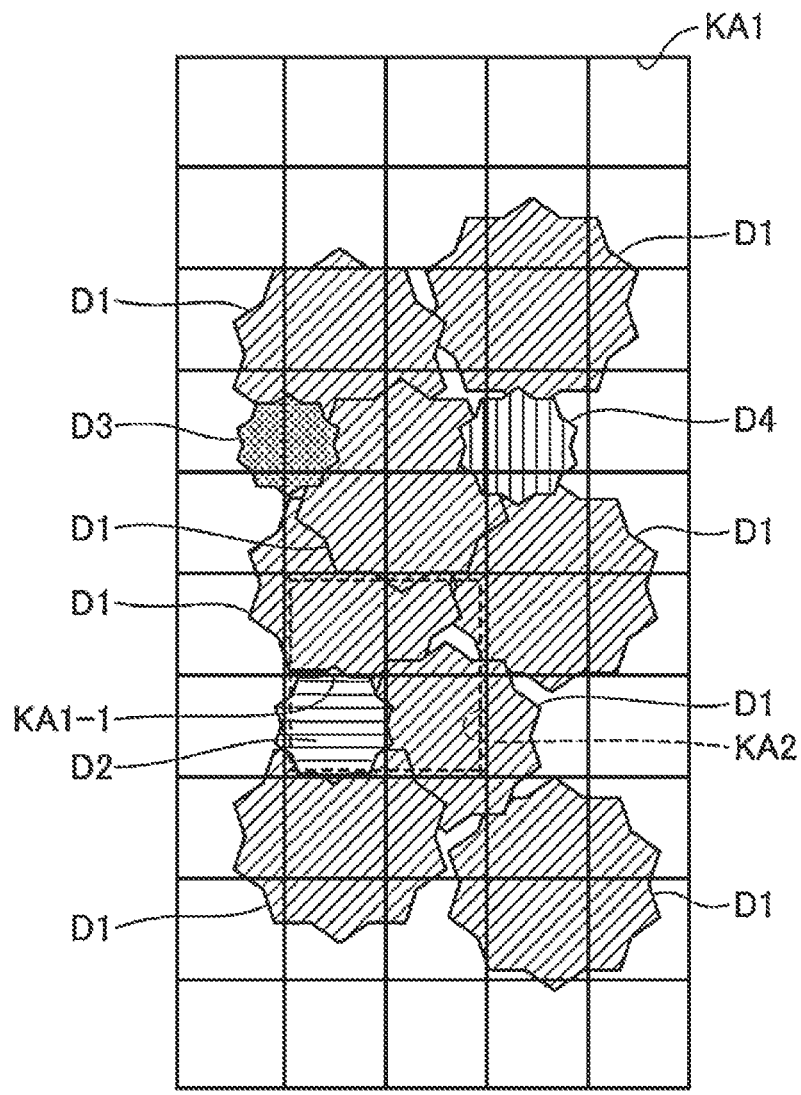
FIG. 9 is a diagram schematically illustrating scan resolutions and ink dots.

FIG. 9 is a diagram schematically illustrating scan resolutions and ink dots.

A dot D1 in composite black illustrated in FIG. 9 illustrates a dot formed of dots of CMYK. The dot D1 in composite black is a dot formed by superimposition of the dots of CMYK. However, in printing in composite black, dots of CMYK are frequently not completely superimposed due to various factors such as the type of ink, a carriage moving speed, and a clearance distance between the ink jet nozzle surface and the surface to be printed of a printing medium. Therefore, as illustrated in FIG. 9, dots of CMYK are formed around the dot D1 of composite black. FIG. 9 illustrates the case in which a dot D2 of cyan, a dot D3 of magenta, and a dot D4 of yellow are formed around the dots D1 of composite black.

In FIG. 9, first resolution areas KA1 each schematically representing a scan resolution are arranged in a grid pattern. The first resolution area KA1 has a scan resolution of 1200 dpi. Thus, in FIG. 9, an area consisting of two first resolution areas KA1 arranged horizontally adjacent to each other and two first resolution areas KA1 arranged vertically adjacent to each other has a scan resolution of 600 dpi. This area will be hereinafter referred to as a second resolution area KA2.

In FIG. 9, at a scan resolution of 1200 dpi, almost entire region of a first resolution area KA1-1 among a plurality of first resolution areas KA1 is covered by the cyan dot D2. That is, the read data generated by scanning at the scan resolution of 1200 dpi is data in which the cyan dot D2 is read in cyan. In contrast, at a scan resolution of 600 dpi, in the second resolution area KA2 including the first resolution area KA1-1, composite black dots D1 are included other than the cyan dot D2. In the second resolution area KA2 illustrated in FIG. 9, the area covered by the composite black dots D1 is larger than the area covered by the cyan dot D2. That is, the read data generated by scanning at the scan resolution of 600 dpi may be data in which the cyan dot D2 is read in black.

As described with reference to FIG. 9, even when a portion of the document is printed in composite black, the scan controller 203 may read the colors of CMY dots formed in the portion as proper colors by using a resolution of 1200 dpi as the scan resolution for authentication determination.

Referring back to the flowchart in FIG. 8, the authentication determination requester 208 obtains the document ID 1111 and the dividing data 1112 from the code image CD represented by read data obtained by scanning in steps SH2 (step SH3).

Subsequently, the authentication determination requester 208 divides the image area GA of the document represented by the read data obtained by scanning in step SH2 in accordance with the respective numbers of horizontal and vertical divided areas that are represented by the dividing data 1112 obtained in step SH3 (step SH4).

Subsequently, the authentication determination requester 208 identifies whether each of the divided areas BA resulting from the division in step SH4 is a composite black area or a pure black area (step SH5). The authentication determination requester 208 identifies the divided area BA as a composite black area if any color of CMY is recognizable and if any color other than white is unrecognizable, and identifies the divided area BA as a pure black area if only black is recognizable.

Subsequently, the authentication determination requester 208 assigns 1 bit of data representing '0' to each of the areas identified as the pure black area and assigns 1 bit of data representing '1' to each of the areas identified as the composite black area (step SH6).

As mentioned above, typically, in the duplicate, black is in pure black or composite black. Therefore, when information is printed only in black in the duplicate, the authentication determination requester 208 will assign 1 bit of data representing '1' or 1 bit of data representing '0' to each of the divided areas BA resulting from the division in step SH4.

Subsequently, the authentication determination requester 208 generates the area data 1113 in which 1 bit of data assigned in step SH6 is described in the same order as 1 bit of data described in the area data 1113 generated by the multi-function printer registrator 205 and the terminal registrator 302 (step SH7). The area data 1113 generated in step SH7 includes an identification result in step SH5.

Subsequently, the authentication determination requester 208 generates authentication determination request information (step SH8). The authentication determination request information generated in step SH8 includes the document ID 1111 obtained in step SH3 and the area data 1113 generated in step SH7.

The multi-function printer communication controller 201 of the third multi-function printer 2C sends the authentication determination request information generated by the authentication determination requester 208 to the server apparatus 1 (step SH9).

As illustrated by the flowchart FI, the server communication controller 101 of the server apparatus 1 receives the authentication determination request information from the third multi-function printer 2C (step SI1).

Subsequently, the database processing unit 102 identifies a record having the document ID 1111, which is included in the authentication determination request information received in step SI1, from the document data management DB 111 (step SI2).

Subsequently, the authentication determiner 103 performs authentication determination based on the area data 1113 included in the authentication determination request information received in step SI1 and the area data 1113 included in the record identified in step SI2 (step SI3).

In step SI3, regarding 1 bit data indicated in the two pieces of the area data 1113 to be compared with each other, if the number of digits and the arrangement order of '1' and '0' are the same in the two pieces of the area data 1113, the authentication determiner 103 determines that the scanned reading target is the authentic printed product AP. However, regarding the 1 bit data indicated in the two pieces of the area data 1113 to be compared with each other, if at least one of the number of digits and the arrangement order of '1' and '0' is not the same in the two pieces of the area data 1113, the authentication determiner 103 determines that the scanned reading target is a duplicate of the authentic printed product AP. This determination corresponds to determining whether a document represented by read data is a document printed in accordance with the area data 1113. Additionally, this determination corresponds to a determination based on a identification result based on the dividing data 1112 and an area represented by the area data 1113.

Subsequently, the authentication determiner 103 generates authentication determination result information indicating a determination result of the authentication determination (step SI4). The authentication determination result information indicates either a determination result of the authentic printed product AP or a determination result of its duplicate.

The server communication controller 101 sends the authentication determination result information generated by the authentication determiner 103, as a response to the authentication determination request information received in step SI1, to the third multi-function printer 2C (step SI5).

As illustrated by the flowchart FH, the multi-function printer communication controller 201 of the third multi-function printer 2C receives the authentication determination result information from the server apparatus 1 (step SH10).

Subsequently, the multi-function printer processor 200 of the third multi-function printer 2C outputs a determination result of the authentication determination indicated by the authentication determination result information received in step SH10 (step SH11).

As the notification way in step SH11, output by means of display operations or output by means of printing may be used.

As described above, the document determination system 1000 includes the server apparatus 1 that stores the document data 1114, the second multi-function printer 2B that generates the authentic printed product AP, which is an authentic printed product in which a document represented by the document data 1114 stored in the server apparatus 1 is printed and in which at least a portion of the document is printed in composite black that is black represented using ink of a plurality of colors, and the third multi-function printer 2C that reads a printed surface of a reading target including the authentic printed product AP and a duplicate of the authentic printed product AP. The server apparatus 1 determines, based on whether at least the portion of the document represented by read data generated through reading by the third multi-function printer 2C is printed in composite black, whether the reading target read by the third multi-function printer 2C is the authentic printed product AP.

According to this, whether the reading target read by the third multi-function printer 2C is the authentic printed product AP may be determined based on whether a portion of the document printed in the reading target read by the third multi-function printer 2C is printed in composite black. Therefore, without performing computations and other operations based on, for example, a hash function, the document determination system 1000 may simply determine whether the reading target is the authentic printed product AP.

The server apparatus 1 stores the area data 1113 representing an area to be printed in composite black in the document represented by the stored document data 1114. The second multi-function printer 2B generates the authentic printed product AP by printing at least the portion of the document in the composite black in accordance with the area data 1113. The server apparatus 1 determines, based on whether the document represented by the read data generated by the third multi-function printer 2C is a document printed in accordance with the stored area data 1113, the reading target read by the third multi-function printer 2C is the authentic printed product AP.

According to this, since the server apparatus 1 may determine whether the document represented by the read data generated by the third multi-function printer 2C is the authentic printed product AP, based on whether the document is a document printed in accordance with the area data 1113 stored in the server apparatus 1, it may be accurately determined whether the reading target read by the third multi-function printer 2C is the authentic printed product AP. Therefore, the document determination system 1000 may simply and accurately determine whether the reading target is the authentic printed product AP.

The code image CD containing the dividing data 1112 for use in identifying an area printed in the composite black is printed in the authentic printed product AP. The second multi-function printer 2B obtains the dividing data 1112 from the code image CD represented by the read data generated through reading by the second multi-function printer 2B and identifies, based on the obtained dividing data 1112, an area printed in composite black in the document printed on the reading target. The server apparatus 1 determines, based on an identification result based on the dividing data 1112 and an area represented by the stored area data 1113, whether the reading target read by the third multi-function printer 2C is the authentic printed product AP.

According to this, it may be accurately determined whether a document represented by read data is a document printed in accordance with the area data 1113, and therefore it may be more accurately determined whether the reading target is the authentic printed product AP. Therefore, the document determination system 1000 may simply and more accurately determine whether the reading target is the authentic printed product AP.

The server apparatus 1 stores the document data 1114, the area data 1113, and the document ID 1111 that identifies the document data 1114 in association with each other. In the authentic printed product AP, the code image CD containing the document ID 1111 is printed. The server apparatus 1 determines whether the reading target read by the third multi-function printer 2C is the authentic printed product AP, based on whether the document represented by the read data generated by the third multi-function printer 2C is a document printed in accordance with the area data 1113 associated with the document ID 1111 contained in the code image CD represented by the read data.

According to this, it may be determined for each piece of the document data 1114 whether a reading target is the authentic printed product AP, and therefore it may be accurately determined for each piece of the document data 1114 whether a reading target read by the third multi-function printer 2C is the authentic printed product AP.

Therefore, the document determination system 1000 may simply and accurately determine, for each piece of the document data 1114, whether the reading target is the authentic printed product AP.

Upon determining whether the reading target read by the third multi-function printer 2C is the authentic printed product AP, the server apparatus 1 sends determination result information indicating a determination result to the third multi-function printer 2C. The third multi-function printer 2C outputs a determination result indicated by the determination result information received from the server apparatus 1.

This enables the user to recognize a determination result in the third multi-function printer 2C that has read a target for determining whether the target is the authentic printed product AP. Therefore, the user may recognize a determination result without operating a device different from the device that has read the determination target. That is, the document determination system 1000 may improve the convenience of the user.

A document determination method implemented by the document determination system 1000 includes a step of generating the authentic printed product AP, which is an authentic printed product in which a document represented by the document data 1114 stored in the server apparatus 1 is printed and in which at least a portion of the document is printed in composite black that is black represented using ink of a plurality of colors, a step of reading, by the third multi-function printer 2C, a printed surface of a reading target including the authentic printed product AP and its duplicate, and a step of determining, based on whether at least a portion of the document represented by read data generated through reading by the third multi-function printer 2C is printed in composite black, whether the reading target read by the third multi-function printer 2C is the authentic printed product AP.

According to this, the same advantageous effects as those of the document determination system 1000 are attained.

The server apparatus 1 includes the server storage 110 that stores the document data 1114, and the authentication determiner 103 that determines, based on whether at least a portion of a document represented by read data generated through reading by the third multi-function printer 2C is printed in composite black, whether a reading target read by the third multi-function printer 2C is the authentic printed product AP, which is an authentic printed product in which a document represented by the document data 1114 stored in the server storage 110 is printed and in which at least a portion of the document represented by the document data 1114 stored in the server storage 110 is printed in composite black.

According to this, the same advantageous effects as those of the document determination system 1000 are attained.

The embodiment described above merely illustrates an aspect of the present disclosure and may be arbitrarily modified and applied within the scope of the present disclosure.

In the embodiment described above, the first multi-function printer 2A is illustrated as the multi-function printer 2 that registers the document data 1114 in the server apparatus 1. However, the multi-function printer 2 that registers the document data 1114 in the server apparatus 1 is not limited to the first multi-function printer 2A and may be the second multi-function printer 2B or the third multi-function printer 2C.

In the embodiment described above, the second multi-function printer 2B is illustrated as the multi-function printer 2 that generates the authentic printed product AP. However, the multi-function printer 2 that generates the authentic printed product AP is not limited to the second multi-function printer 2B and may be the first multi-function printer 2A or the third multi-function printer 2C. In this case, the first multi-function printer 2A or the third multi-function printer 2C corresponds to an example of a printing apparatus.

In the embodiment described above, the third multi-function printer 2C is illustrated as the multi-function printer 2 that requests authentication determination. However, the multi-function printer 2 that requests authentication determination is not limited to the third multi-function printer 2C and may be the first multi-function printer 2A or the second multi-function printer 2B. In this case, the first multi-function printer 2A or the second multi-function printer 2B corresponds to an example of a reading apparatus.

In the embodiment described above, when the multi-function printer 2 serves as the printing apparatus, the multi-function printer processor 200 may serve as at least the multi-function printer communication controller 201, the print controller 202, the scan controller 203, the authenticator 204, the document data requester 206, and the print data generator 207.

In the embodiment described above, when the multi-function printer 2 serves as the reading apparatus, the multi-function printer processor 200 may serve as at least the multi-function printer communication controller 201, the print controller 202, the scan controller 203, and the authentication determination requester 208.

In the embodiment described above, the number of times the division is performed in step SC1 is not limited to the five vertical divisions and four horizontal divisions. In step SC1, the image area GA of the document may be further divided into smaller portions.

In the embodiment described above, a serial ink jet method is illustrated as the printing method of the multi-function printer 2; however, the printing method of the multi-function printer 2 may be a line ink jet method. Additionally, the printing method of the multi-function printer 2 is not limited to the ink jet method and may be another printing method such as an electrophotographic printing method using a toner. For example, in the case where the printing method is an electrophotographic printing method, a toner corresponds to an example of a printing material.

In the embodiment described above, the multi-function printer 2 is illustrated as a printing apparatus; however, the printing apparatus is not limited to the multi-function printer 2 and may be a printing apparatus such as a printer without a scan function.

The functions of the server processor 100, the multi-function printer processor 200, and the terminal processor 300 may be implemented by one or more processors or a semiconductor chip.

The components illustrated in FIG. 1 are exemplary and specific implementations are not limited. In other words, hardware individually corresponding to each component is not to be implemented, and the configuration may be, of course, such that the functions of components are implemented by a single processor executing programs. Some of the functions implemented by software in the embodiment described above may be hardware. Alternatively, some of the functions implemented by hardware may be implemented by software. In addition, the specific detailed configurations of the other components of the server apparatus 1, the multi-function printer 2, and the terminal device 3 may be changed to any configurations without departing from the gist the present disclosure.

The step units of the operations illustrated in FIG. 2, FIG. 3, FIG. 5, FIG. 6, and FIG. 8 are those into which the operations of each apparatus of the document determination system 1000 are divided according to the main process content for ease of understanding, and the present disclosure will not be limited by how the process is divided into the process units and what are the names of the process units. The process units may also be divided into more process units according to the process content. The process units of the flowchart may also be divided such that one process unit includes more processes. The step order may be changed appropriately without departing from the sprit and scope of the present disclosure.

What is claimed is:

1. A document determination system comprising:
an information processing apparatus configured to store document data;
a printing apparatus configured to generate an authentic printed product, in which a document represented by the document data stored in the information processing apparatus is printed and in which at least a portion of the document is printed in composite black, the composite black being black represented using printing materials of a plurality of colors; and
a reading apparatus configured to read a printed surface of a reading target including the authentic printed product or a duplicate of the authentic printed product, wherein
the information processing apparatus is configured to determine, based on whether the at least the portion of the document represented by read data generated through reading by the reading apparatus is printed in the composite black, whether the reading target read by the reading apparatus is the authentic printed product,
the information processing apparatus is configured to store area data representing an area to be printed in the composite black in the document,
the printing apparatus is configured to generate the authentic printed product by printing the at least the portion of the document in the composite black in accordance with the area data,
the information processing apparatus is configured to determine, based on whether the document represented by the read data is the document printed in accordance with the stored area data, whether the reading target read by the reading apparatus is the authentic printed product,
a code image containing identification data for use in identifying an area printed in the composite black is printed in the authentic printed product,
the reading apparatus is configured to obtain the identification data from the code image represented by the read data and to identify, based on the obtained identification data, an area printed in the composite black in the document printed on the reading target, and
the information processing apparatus is configured to determine, based on an identification result based on the identification data and an area represented by the stored area data, whether the reading target read by the reading apparatus is the authentic printed product.

2. The document determination system according to claim 1, wherein
the information processing apparatus is configured to store the document data, the area data, and identification information identifying the document data in association with each other,
a code image containing the identification information is printed in the authentic printed product, and
the information processing apparatus is configured to determine, based on whether the document represented by the read data is the document printed in accordance with the area data associated with the identification information contained in the code image represented by the read data, whether the reading target read by the reading apparatus is the authentic printed product.

3. The document determination system according to claim 1, wherein
the information processing apparatus is configured to send determination result information indicating a determination result to the reading apparatus upon determining whether the reading target read by the reading apparatus is the authentic printed product, and
the reading apparatus is configured to output a determination result indicated by the determination result information received from the information processing apparatus.

4. A document determination method comprising:
generating an authentic printed product, in which a document represented by document data stored in an information processing apparatus is printed and in which at least a portion of the document is printed in composite black, the composite black being black represented using printing materials of a plurality of colors;

reading, by a reading apparatus, a printed surface of a reading target including the authentic printed product and a duplicate of the authentic printed product; and determining, based on whether the at least the portion of the document represented by read data generated through reading by the reading apparatus is printed in the composite black, whether the reading target read by the reading apparatus is the authentic printed product, area data representing an area to be printed in the composite black in the document is stored in the information processing apparatus, the authentic printed product is generated by printing the at least the portion of the document in the composite black in accordance with the area data, it is determined by the information processing apparatus, based on whether the document represented by the read data is the document printed in accordance with the stored area data, whether the reading target read by the reading apparatus is the authentic printed product, a code image containing identification data for use in identifying an area printed in the composite black is printed in the authentic printed product, the identification data is obtained by the reading apparatus from the code image represented by the read data and to identify, based on the obtained identification data, an area printed in the composite black in the document printed on the reading target, and it is determined by the information processing apparatus, based on an identification result based on the identification data and an area represented by the stored area data, whether the reading target read by the reading apparatus is the authentic printed product.

5. An information processing apparatus comprising:

a storage configured to store document data; and an authentication determiner configured to determine, based on whether at least a portion of a document represented by read data generated through reading by a reading apparatus is printed in composite black, the composite black being black represented using a plurality of printing materials, whether a reading target read by the reading apparatus is an authentic printed product in which a document represented by the document data stored in the storage is printed and in which at least a portion of the document represented by the document data stored in the storage is printed in the composite black, wherein the storage is further configured to store area data representing an area to be printed in the composite black in the document, the authentic printed product is generated by printing the at least the portion of the document in the composite black in accordance with the area data, the authentication determiner is further configured to determine, based on whether the document represented by the read data is the document printed in accordance with the stored area data, whether the reading target read by the reading apparatus is the authentic printed product, a code image containing identification data for use in identifying an area printed in the composite black is printed in the authentic printed product, the identification data is obtained from the code image represented by the read data and to identify, based on the obtained identification data, an area printed in the composite black in the document printed on the reading target, and the authentication determiner is further configured to determine, based on an identification result based on the identification data and an area represented by the stored area data, whether the reading target read by the reading apparatus is the authentic printed product.

6. A document determination system comprising:

an information processing apparatus configured to store document data;

a printing apparatus configured to generate an authentic printed product, in which a document represented by the document data stored in the information processing apparatus is printed and in which at least a portion of the document is printed in composite black, the composite black being black represented using printing materials of a plurality of colors; and a reading apparatus configured to read a printed surface of a reading target including the authentic printed product or a duplicate of the authentic printed product, wherein the information processing apparatus is configured to determine, based on whether the at least the portion of the document represented by read data generated through reading by the reading apparatus is printed in the composite black, whether the reading target read by the reading apparatus is the authentic printed product, the information processing apparatus is configured to store area data representing an area to be printed in the composite black in the document, the printing apparatus is configured to generate the authentic printed product by printing the at least the portion of the document in the composite black in accordance with the area data, the information processing apparatus is configured to determine, based on whether the document represented by the read data is the document printed in accordance with the stored area data, whether the reading target read by the reading apparatus is the authentic printed product, the information processing apparatus is configured to store the document data, the area data, and identification information identifying the document data in association with each other, a code image containing the identification information is printed in the authentic printed product, and the information processing apparatus is configured to determine, based on whether the document represented by the read data is the document printed in accordance with the area data associated with the identification information contained in the code image represented by the read data, whether the reading target read by the reading apparatus is the authentic printed product.

* * * * *